May 11, 1926.　　　　　　　　　　　　　　　1,583,841
G. V. KARLSON
SIGNAL FLASHER
Filed Oct. 25, 1923　　　2 Sheets-Sheet 1

INVENTOR
Gustav V. Karlson
BY
Redding, Greeley, O'Shea & Campbell
ATTORNEYS

May 11, 1926.

G. V. KARLSON

SIGNAL FLASHER

Filed Oct. 25, 1923

INVENTOR
Gustav V. Karlson
BY
Redding, Greeley, O'Shea & Campbell
ATTORNEYS

Patented May 11, 1926.

1,583,841

UNITED STATES PATENT OFFICE.

GUSTAV V. KARLSON, OF ELIZABETH, NEW JERSEY, ASSIGNOR TO INTERFLASH SIGNAL CORPORATION, OF NEW YORK, N. Y., A CORPORATION OF NEW YORK.

SIGNAL FLASHER.

Application filed October 25, 1923. Serial No. 670,643.

This invention relates generally to the type of flasher shown in Letters Patent of the United States No. 1,447,136 dated February 27, 1923, wherein suitable valve mechanism controls the inflow of gas to a pressure chamber and the outflow therefrom to a burner in predetermined quantities at predetermined times for regulation of the period of flame and the rate of flashes. The improvements herein are directed to a flasher adapted for simple control under a single diaphragm in a pressure chamber of two or more burners. In accordance with the preferred embodiment of the invention most of the characteristic features of the control mechanism described in said patent are retained in principle and are combined operatively with a rotary distributing valve by which the admission of charges of gas to predetermined burners is automatically provided for. The preferred flash period may be regulated in the improved mechanism as heretofore and the frequency of flashes may also be controlled. It is proposed to associate with the operating spring arms for the inlet valve means by which the rotary distributing valve is actuated in timed relation to the actuation of the inlet valve, such means in the preferred form including a pawl carried with the arms and engaging a ratchet on the valve. By reason of the results obtained in the manner described it may be stated, as an additional broad object of the invention, to incorporate in a single flasher a single inlet valve for the control of the flow of gas into the pressure chamber and a single distributing valve for a plurality of burners to control the outflow of gas from the pressure chamber, said valves being operable in predetermined timed relation. Still another object of the invention is to associate in a flasher of the character described a valve independent of the distributing valve for cutting off the flow of gas thereto during the open period of the inlet valve for the gas chamber. This cut off valve may be carried on the same stem with the inlet valve so that the two may be operated simultaneously and in desired timed relation by the spring actuating arms and a quick cut off thereby insured.

These and other objects will appear in greater length in connection with the detailed description of the embodiment illustrated in the drawings wherein.

Figure 1:
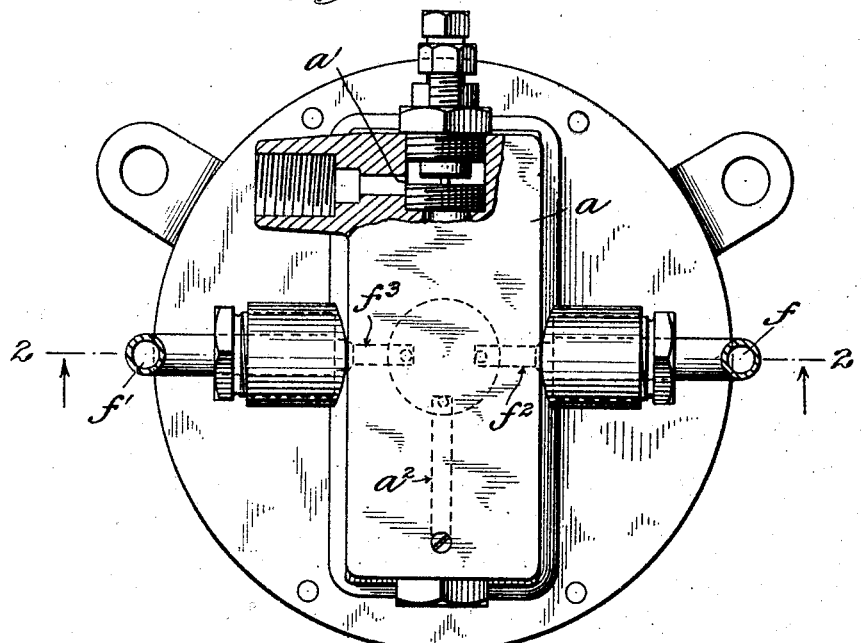
Figure 1 is a view in plan of the flasher housing parts being broken away to show the inlet to the pressure chamber, two outlet pipes to two burners and, in dotted lines, the relation of the distributing valve to the supply channel from the pressure chamber and the supply pipes for the burners.
Figure 2:
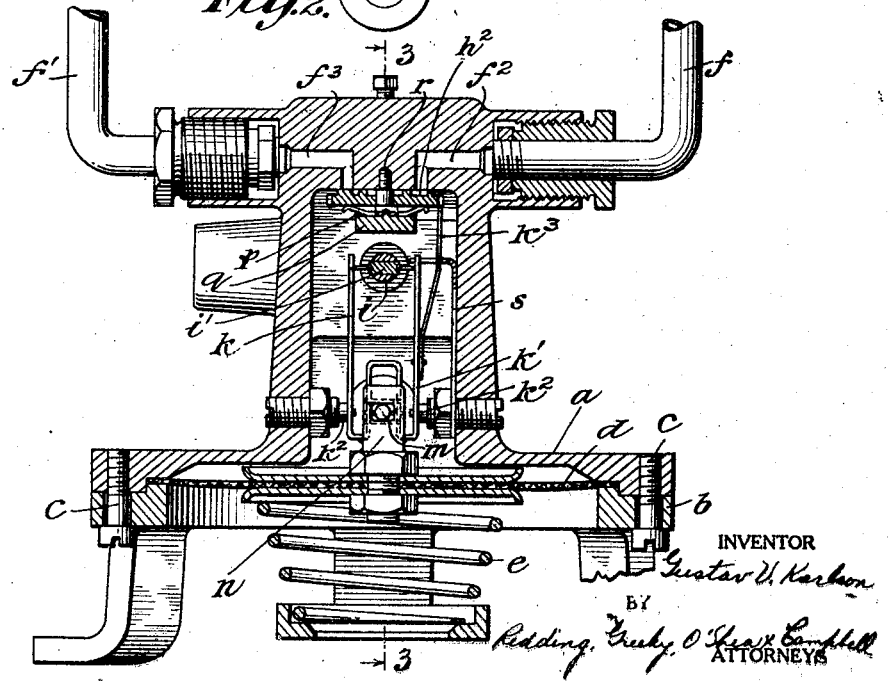
Figure 2 is a view in vertical section through the parts shown in Figure 1 and taken on the plane indicated by the line 2—2 of Figures 1 and 3 and looking in the direction of the arrows.
Figure 3:
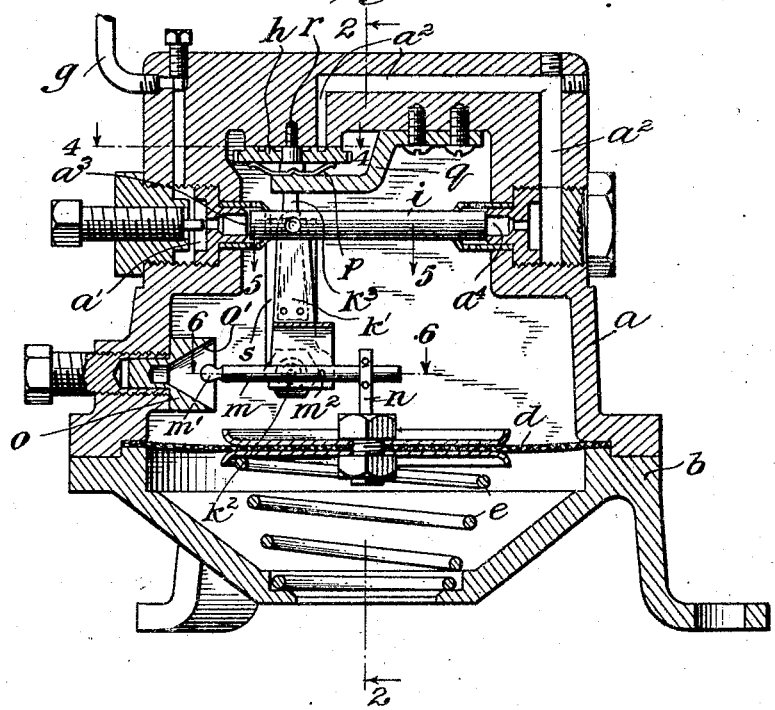
Figure 3 is a view in vertical section taken on a plane at right angles to the plane of the section of Figure 2 and on the line indicated at 3—3 of Figure 2.
Figure 5:
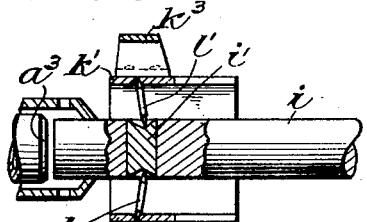
Figure 5 is a detailed view in section showing a suitable inlet valve and the actuating means therefor, and taking on the plane indicated by the line 5—5 of Figure 3 and looking in the direction of the arrows.

The flasher housing $a$ which forms the pressure chamber to receive the gas may be secured to a suitable base $b$ by screws $c$, a flexible diaphragm $d$ being clamped between the housing $a$ and the base $b$ and being movable under the pressure of the gas within the housing $a$ against the action of the spring $e$. Gas is supplied to the pressure chamber through an inlet channel $a'$ to which may be connected a pipe from any source of supply and in the construction illustrated it is proposed to supply gas to at least two burners, supply pipes therefor leading from the pressure chamber being indicated at $f$, $f'$, gas channels $f^2$, $f^3$, being formed in the housing $a$ and extending from the respective pipes to the interior of the casing in a manner which will hereinafter appear. Gas for the pilot lights may be led from the inlet channel $a'$ through a pipe $g$ or pipes as will be understood. From the interior of the pressure chamber in the casing $a$ gas is to be led to the supply ducts $f^2$, $f^3$, for the respective burner pipes $f$, $f'$, under the control of a distributing valve and in accordance with the illustrated embodiment the gas first passes through a controlled channel $a^2$ from the pressure chamber to the distributing valve $h$ which will be more particularly described later. Having in mind the general means heretofore described it becomes the particular problem to control the flow of gas into the pressure chamber and the flow of gas therefrom to one of the predetermined burners and preferably to time the operation of the inlet valve and the distributing valve so that the most efficient operation is insured and the frequency and period of flashes closely controlled. Further, the invention is concerned with the means by which the problem is met and while the claims hereinafter are not expressly limited to the details illustrated these will be described with some particularity herein to enable those skilled in the art to construct an operative device. The inlet passage $a'$ terminates in a seat $a^3$ controlled by a reciprocating valve $i$ formed as a rod and is actuated by opposed spring arms $k$, $k'$, pivoted for oscillation on pins $k^2$ carried in the side walls of the chamber $a$. In the preferred construction the valve rod $i$ has mounted loosely therein a diametrically extending bearing block $i'$ engaged at its ends by pins $l$, $l'$, which are seated on the opposed spring arms $k$, $k'$. Upon oscillation of the arms $k$, $k'$, on their pivots $k^2$ the pins $l$, $l'$ are moved through dead center against the pressure of the springs and cause the valve rod $i$ to reciprocate with a quick movement for opening and closing the inlet port $a^3$ in the same general manner described in Patent No. 1,447,136.

Oscillation of the spring arms $k$, $k'$, on their respective pivots $k^2$ is effected by a lever $m$ one end of which is loosely engaged by a stirrup $n$ carried with the diaphragm $d$ and the other end $m'$ of which constituting the fulcrum is adapted to engage the side wall of an adjustable abutment $o$ therefor having a recess $o'$ of frusto-conical form. The lever $m$ is pivoted to the interconnected spring arms $k$, $k'$, by a pin $m^2$ at one side of the pivotal support $k^2$ for the arms. Movement of the diaphragm $d$ under the pressure of gas within the pressure chamber $a$ carries the end $m'$ of the lever $m$ into engagement with the walls of the abutment $o$ and then rocks the arms on their pivots thereby effecting intermittent reciprocation of the valve rod $i$ to alternately open and close the inlet port $a^3$.

From the pressure chamber $a$ the charge of gas is admitted past a port $a^4$ through the channel $a^2$ to the distributing valve $h$. The end of the valve rod $i$ may serve to control the port $a^4$ so that this port is closed so long as the inlet port $a^3$ is open while the port $a^4$ is open so long as the inlet port $a^3$ is closed.

Figure 4:
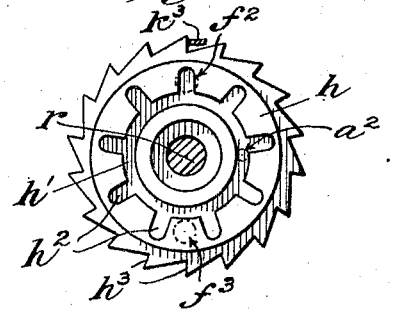
Figure 4 is a view in plan of a suitable distributing valve as viewed on the line 4—4 of Figure 3.
Figure 6:
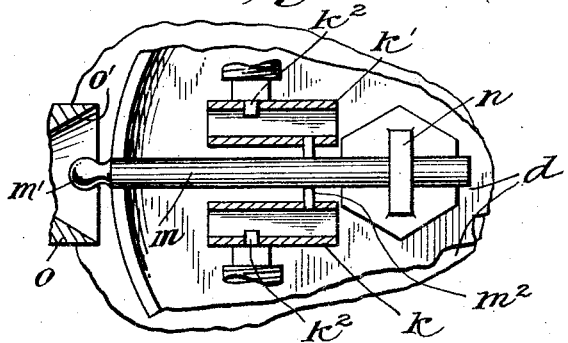
Figure 6 is a fragmentary view in detail partly in horizontal section and partly in plan showing the operative connections between the diaphragm and the spring arms and taken on the plane indicated by the line 6—6 of Figure 3 and looking in the direction of the arrows.

The valve $h$ is shown as of generally cylindrical form and as having an annular groove $h'$ in its upper face communicating with a plurality of radial pockets $h^2$. The valve is mounted yieldingly on a spring $p$ which may be carried by a bracket $q$ to fasten on the inner wall of the casing $a$. A centering stud $r$ serves to hold the valve against lateral displacement during operation thereof. As mounted, the annular channel $h'$ is in constant communication with the channel $a^2$. A gas tight lap fit between the valve $h$ and the inner wall of the casing $a$ is maintained by the spring $p$. The channels $f^2$, $f^3$, leading to the burner pipes $f$, $f'$, respectively are at a grater distance from the center pin $r$ than the annular channel $h'$ so that these ports are overlapped by the face of the valve $h$ but are placed in communication, at predetermined times, with the channel $h'$, for alignment therewith of one of the pockets $h^2$. The pockets $h^2$ are in such number and are so disposed that when one of the pockets $h^2$ is in communication with one of the ducts $f^2$ the other duct $f^3$ is lapped by the valve face, as indicated in Figure 4. Where two burners are fed by the distributing valve the respective ducts are brought into communication alternately with a pocket $h^2$ so that first one burner and then the other is fed the charge of gas through the annular channel $h'$.

The distributing valve $h$ in the illustrated form is actuated by a pawl $k^3$ carried on one of the spring arms $k'$ and engaging teeth $h^3$ of a ratchet formed on the periphery of the cylindrical valve. Oscillation of the arm $k'$ in one direction will rotate the valve $h$ a predetermined distance for proper alignment of a pocket with a port to be controlled while oscillation of the arm in the other direction will bring the pawl into engagement with another tooth of the ratchet for subsequent actuation of the valve. A stop $s$ may be secured to the casing $a$ and co-operate with the pawl $k^3$ to limit its travel and the travel of the arm $k'$.

The operation of the improved flasher should be clear from the foregoing description. The inlet port $a^3$ and discharge port $a^4$ are controlled by valves which operate in predetermined timed sequence and their movement is initiated by operation of the diaphragm $d$. Similary, the distributing valve $h$ is operated in predetermined timed relation to the controlling valves for the aforementioned ports $a^3$, $a^4$. A quick opening and closing of the ports $a^3$ and $a^4$ is assured by the operating mechanism provided so that flashes of predetermined periods may readily be obtained through the admission to the burners of predetermined charges and the frequency of the flashes may also be controlled accurately through the adjustment of the abutment $o$. The entire construction is simple, compact, accessible and effective for the purpose described. The invention is not to be limited to the number of burners controlled nor to the details of construction nor design of the elements employed for controlling the respective burners and ports since the broader aspects of the invention are concerned with the timing of the various valves.

What I claim is:

1. In a gas signal flasher for a plurality of burners, a pressure chamber, inlet and outlet valves to control the flow of gas to and from said pressure chamber, valve means to control the flow of gas to the respective burners from the pressure chamber, a diaphragm movable by the gas, and means operatively interconnecting the diaphragm with all of the valves for operation thereof in predetermined sequence.

2. In a gas signal flasher having a plurality of burners, a pressure chamber, inlet and outlet valves to control the flow of gas to and from said pressure chamber, a signal distributing valve in said pressure chamber to control the flow of gas from the pressure chamber to the burners in predetermined sequence, a diaphragm movable by the gas, and means operatively interposed between the diaphragm and the distributing valve to actuate the same.

3. In a gas signal flasher having a plurality of burners, a pressure chamber, inlet and outlet valves to control the flow of gas to and from said pressure chamber, means carrying said valve for operation in predetermined timed sequence, a single distributing valve to control the flow of gas to the respective burners in timed sequence, a diaphragm movable by the gas, and means operatively connecting the diaphragm with all of the respective valves for actuation thereof.

4. In a gas signal flasher having a plurality of burners, a pressure chamber, an inlet valve to control the flow of gas into said chamber, a single valve in said chamber to control the flow of gas from the pressure chamber to the respective burners in predetermined sequence, a diaphragm movable by the gas, and means to actuate the second named valve by the diaphragm.

5. In a gas signal flasher having a plurality of burners, a pressure chamber, an inlet valve to control the flow of gas into the pressure chamber, a single rotary distributing valve in said pressure chamber to control the flow of gas from the pressure chamber to the burners in predetermined sequence, and means to actuate the distributing valve.

6. In a gas signal flasher having a plurality of burners, a pressure chamber having a diaphragm disposed therein, means actuated by the diaphragm to control the flow of gas to the pressure chamber, a single distributing valve to control the flow from the pressure chamber to the respective burners in predetermined sequence, and pawl and ratchet means actuated by the diaphragm to actuate the distributing valve.

7. In a gas signal flasher having a plurality of burners, a pressure chamber, means to control the flow of gas to the pressure chamber, a single distributing valve in the pressure chamber to control the flow from the pressure chamber to the respective burners in predetermined sequence, a diaphragm movable by the gas, and a pawl and ratchet connection between the diaphragm and distributing valve for periodical action thereof from the diaphragm.

8. In a gas signal flasher having a plurality of burners, a pressure chamber, inlet and outlet valves to control the flow of gas to and from said pressure chamber at predetermined times, a rotary distributing valve disposed in said chamber for said burners to which the flow of gas is controlled by said rotary valve, and means carried with the distributing valve to admit charges of gas to the respective burners in predetermined sequence.

9. In a gas signal flasher having a plurality of burners, a pressure chamber, inlet and outlet valves to control the flow of gas to and from said pressure chamber at predetermined times, a rotary distributing valve for said burners to which the flow of gas is controlled by said rotary valve, means carried with the distributing valve to admit charges of gas to the respective burners in predetermined sequence, a diaphragm movable under the pressure of the gas, and means actuated by the diaphragm to move said valves.

10. In a gas signal flasher having a plurality of burners, a pressure chamber, inlet and outlet valves to control the flow of gas to and from said pressure chamber at predetermined times, a rotary distributing valve for said burners to which the flow of gas is controlled by said rotary valve, means carried with the distributing valve to admit charges of gas to the respective burners in predetermined sequence, a diaphragm movable by the pressure of the gas, and a pawl and ratchet drive interposed operatively between the diaphragm and the distributing valve for periodic actuation thereof.

11. In a gas signal flasher having a plurality of burners, a pressure chamber, an inlet valve to control the flow of gas to the pressure chamber, a single distributing valve to selectively control the flow of gas to the respective burners, and common means to actuate said valves.

12. In a gas signal flasher having a plurality of burners, a pressure chamber, an inlet valve to control the flow of gas to the pressure chamber, a single distributing valve to control the flow of gas from the pressure chamber to the respective burners in timed relation, a diaphragm movable by the gas, spring arms between the diaphragm and the inlet valve to open and close the valve quickly, a pawl movable with the spring arms and a ratchet carried by the distributing valve engageable operatively by the pawl for actuation of the valve.

13. In a gas signal flasher having a plurality of burners, a pressure chamber, a rotary distributing valve to control the flow of gas from the pressure chamber to the burners including a disk having an annular channel in constant communication with the source of supply of gas, and a plurality of radially disposed pockets in communication with said channel and movable into alignment with the supply ducts for the respective burners.

14. In a gas signal flasher having a plurality of burners, a pressure chamber, a rotary distributing valve to control the flow of gas from the pressure chamber to the burners including a disk having an annular channel in constant communication with the source of supply of gas, a plurality of radially disposed pockets in communication with said channel and movable into alignment with the supply ducts for the respective burners, and means to support the disk yieldingly in lapped relation to all of said ducts.

15. In a gas signal flasher in combination with a pressure chamber, inlet and outlet ports for the gas, a single valve rod having its ends mounted in operative relation to said ports to constitute lapped controlling valves therefor, means including a lost motion connection to reciprocate the rod to open and close the respective ports alternately and means to vary the lost motion connection to regulate the period of flashing.

This specification signed this 24 day of October A. D. 1923.

GUSTAV V. KARLSON.